United States Patent
Kan et al.

(10) Patent No.: US 7,999,731 B2
(45) Date of Patent: Aug. 16, 2011

(54) GPS DATA RECORDING APPARATUS AND RELATED METHOD THEREOF

(75) Inventors: Ping-Hsin Kan, Chiayi (TW); Chun-Ming Huang, Tao-Yuan (TW); Sergey Pospelov, St. Petersburg (RU); Andrey Bochkovskiy, St. Petersburg (RU); Nikolay Mikhaylov, St. Petersburg (RU); Bijan Jalali, Irvine, CA (US)

(73) Assignee: MStar Semiconductor, Inc., ChuPei, Hsin-Chu Hsien (TW)

( * ) Notice: Subject to any disclaimer, the term of this patent is extended or adjusted under 35 U.S.C. 154(b) by 310 days.

(21) Appl. No.: 12/129,696

(22) Filed: May 30, 2008

(65) Prior Publication Data

US 2009/0002232 A1   Jan. 1, 2009

(30) Foreign Application Priority Data

Jun. 29, 2007   (TW) .............................. 96123811 A

(51) Int. Cl.
*G01S 19/23* (2010.01)
(52) U.S. Cl. ................................. 342/357.62
(58) Field of Classification Search ............. 342/357.13, 342/357.62
See application file for complete search history.

(56) References Cited

U.S. PATENT DOCUMENTS

| | | | | |
|---|---|---|---|---|
| 5,379,224 A * | 1/1995 | Brown et al. | ............ | 342/357.48 |
| 5,557,524 A | 9/1996 | Maki | | |
| 6,114,989 A * | 9/2000 | Fontes et al. | ............. | 342/357.13 |
| 6,449,485 B1 * | 9/2002 | Anzil | ..................... | 342/357.47 |
| 6,498,983 B2 | 12/2002 | Hashida | | |
| 2002/0198656 A1 * | 12/2002 | Ford et al. | ................ | 342/357.14 |
| 2005/0280569 A1 * | 12/2005 | Park | .............................. | 341/155 |

FOREIGN PATENT DOCUMENTS

| | | |
|---|---|---|
| CN | 1862284 A | 11/2006 |
| TW | 351033 | 1/1999 |
| TW | 200507479 | 2/2005 |
| TW | 1258719 | 7/2006 |
| TW | 1280405 | 5/2007 |
| TW | 200721788 | 6/2007 |

OTHER PUBLICATIONS

Packet (information technology), Wikipedia, http://en.wikipedia.org/wiki/Packet_(information_technology).*
Packet. (2003). In Webster's New World™ Computer Dictionary. Retrieved from http://www.credoreference.com/entry/webstercom/packet.*
Packet. (1999). In Focal Dictionary of Telecommunications, Focal Press. Retrieved from http://www.credoreference.com/entry/bhfidt/packet.*
Packet. (2007). In The American Heritage® Dictionary of the English Language. Retrieved from http://www.credoreference.com/entry/hmdictenglang/packet.*
Parkinson, B.W; Spilker, J.J. Global Positioning System: Theory and Applications, vol. 1; Progress in Astronautics and Aeronautics, vol. 163, American Institute of Aeronautics and Astronautics, Inc., p. 121-149 and 175-176, 1996.*
English translation of CN 1862284 A.*

* cited by examiner

*Primary Examiner* — Thomas Tarcza
*Assistant Examiner* — Fred H Mull
(74) *Attorney, Agent, or Firm* — Winston Hsu; Scott Margo

(57) ABSTRACT

A GPS data recording apparatus includes a storage device and a processing circuit coupled to the storage device. The processing circuit comprises: a sampling module, for sampling a GPS data; and a packet processor, for packetizing the sampled GPS data to generate a data packet to be stored in the storage device, and for unpacketizing the stored data packet from the storage device if necessary. According to present invention, GPS data can be recorded and be replayed as necessary.

8 Claims, 2 Drawing Sheets

GPS DATA RECORDING APPARATUS AND RELATED METHOD THEREOF

BACKGROUND OF THE INVENTION

1. Field of the Invention

The present invention relates a GPS data recording apparatus and a related method thereof, and particularly relates to a GPS data recording apparatus, which can record and replay GPS data, and a related method thereof.

2. Description of the Prior Art

GPS (Global Positioning System) was established by USA government, which can be roughly classified into three major parts: a universe satellite part, a ground management part and a user receiver part. The universe satellite part is composed of 24 satellites, which are divided into six tracks, operate at a height of 20,200 kilometers, and spend 12 hours to go round the earth. Each satellite transmits wireless radio waves with satellite track data and time to various receivers on the earth. The ground management part is a ground management station for tracking and controlling operations of the above-mentioned satellites. The main duty of the ground management station is to amend and maintain parameter information according to which each satellite can operate correctly, whereby each satellite can provide correct information to a user receiver. A user receiver is used for tracking all GPS satellites, and calculates the coordinates of a receiver's location, moving speed and time. The part of this GPS system that is utilized and owned by the mass population is the user receiver part.

The computing theorem of GPS is as follows. Each satellite has a coordinate (a known value) indicating the location of which at every moment when it operates, and the receiver has an unknown value. The transmission time of a satellite message can be obtained via clocks in the satellite and the receiver. The distance between the satellite and the user receiver can be computed via multiplying the difference between the clocks in the satellite and the receiver with a wave transmission speed (i.e. light speed), whereby a relative equation can be obtained according to trigonometry vector. A receiver utilizes such an algorithm to compute the coordinates of the location thereof. A relative equation can be obtained once signals of a satellite are obtained, and thus a plane coordinate value can be obtained (i.e. longitude and latitude) if signals of at least three satellites are received. If signals of four satellites are received, a height value can be obtained; if signals of more than five satellites are received, the accuracy of the coordinates increases. The above-mentioned description briefly explains the basic positioning rule of GPS, and other detail GPS operation can be obtained via GPS documents provided by GPS manufacturers.

Besides in navigation systems for cars, GPS is gradually being utilized for other electronic products as well, and therefore the measurement and experimenting of GPS data become important issues for each manufacturer. Conventionally, a GPS simulation system is utilized for compiling GPS signal data, but GPS data in the real word is easily affected by various effects and interferences. Additionally, the scope that a GPS simulation system can simulate is limited, and therefore a large difference may exist between real and simulated GPS data.

SUMMARY OF THE INVENTION

Therefore, one objective of the present invention is to provide a GPS data recording apparatus for storing GPS data and the stored GPS data can be retrieved when necessary.

One embodiment of the present invention discloses a GPS data recording apparatus, which includes a storage device and a processing circuit coupled to the storage device. The processing circuit, coupled to the storage device, comprises: a sampling module, for sampling GPS data to generate sampled GPS data; and a packet processor, for packetizing the sampled GPS data to generate a data packet to be stored in the storage device, and for unpacketizing the stored data packet from the storage device if necessary.

The present invention further discloses a GPS data recording method, comprising: obtaining GPS data; sampling the GPS data to generate sampled GPS data; packetizing the sampled GPS data to generate a data packet; and storing the data packet in a storage device.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
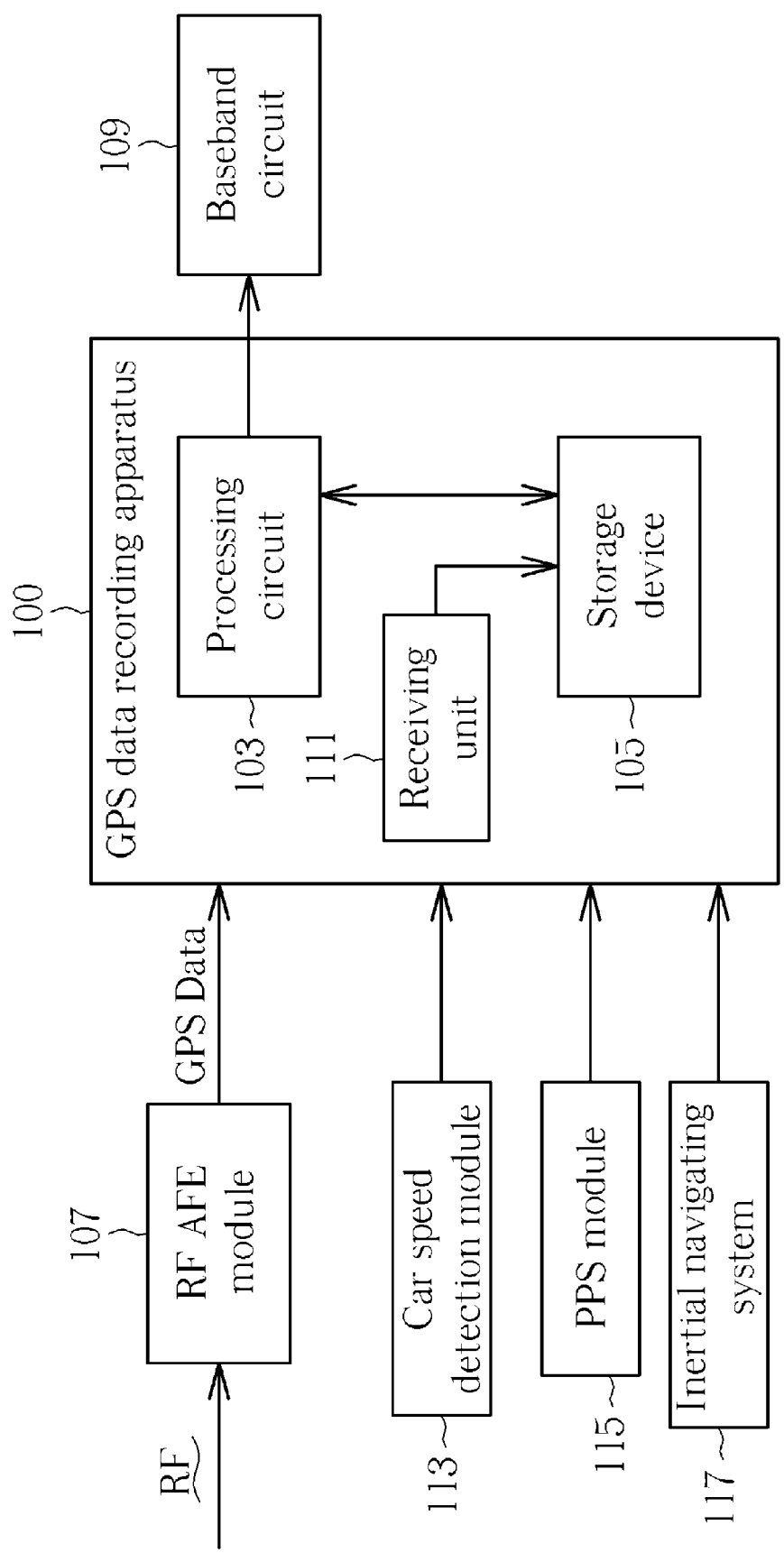
FIG. 1 is a circuit diagram illustrating a GPS data recording apparatus according to one embodiment of the present invention.

FIG. 1 is a circuit diagram illustrating a GPS data recording apparatus 100 according to one embodiment of the present invention. As shown in FIG. 1, GPS data recording apparatus 100 comprises a processing circuit 103 and a storage device 105. The processing circuit 103 is coupled to the storage device 105 for processing received GPS data and storing processed GPS data to the storage device 105. The processing circuit 103 is capable of retrieving the processed GPS data stored in the storage device 105 and outputting the processed GPS data. In one embodiment, the processing circuit 103 packetizes GPS data into packets and stores the packets to the storage device 105. The processing circuit 103 further retrieves packets and unpacketizes packets to original GPS data. In another embodiment, the processing circuit 103 is used for sampling GPS data and storing the sampled GPS data to the storage device 105.

The processing circuit 103 can be coupled to an RF AFE (Analog Front End) module 107 and a baseband circuit 109. The RF AFE module 107 receives GPS RF signal and transforms the GPS RF signal to GPS data. The GPS data can be carried on an Intermediate Frequency (IF) signal. The processing circuit 103 receives the GPS data, processes the GPS data and stores processed GPS data to the storage device 105.

The baseband circuit 109 is coupled to the processing circuit 103, for further processing GPS data retrieved by the processing circuit 103 from the storage device 105. Since the operation and the structure of the RF AFE module 107 and the baseband circuit 109 belong to the scope of prior art, it is omitted for brevity.

Besides the GPS data, the storage device 105 can further store other external location auxiliary information. For example, the GPS data recording apparatus 100 can further include a receiving unit 111, which is coupled to the storage device 105, for receiving external location auxiliary information and for storing external location auxiliary information to the storage device 105. In this embodiment, the receiving unit 111 can be coupled to a car speed detection module 113, a PPS (Pulse Per Second) module 115, or an inertial navigating system 117. The car speed detection module 113 is used for detecting the rotating speed of tires. The PPS module 115 can provide accurate pulse signals, and the inertial navigating system 117 can be a gyroscope or an accelerator, which can help locate the target when the target loses signal. The external location auxiliary information provided by these apparatuses can be stored to the storage device 105, and can be retrieved and processed with GPS data. Also, the receiving unit 111 can be integrated to the processing circuit 103.

According to above-mentioned system, real GPS data can be recorded (utilizing the processing circuit 103 to store GPS data to the storage device 105), and replay or reproduce the GPS data when necessary (utilizing the processing circuit 103 to retrieve GPS data from the storage device, and output it to the baseband processing circuit 109 for processing). Of course, recorded GPS data can be replayed again and again. In this way, GPS data of different times and places can be recorded and replayed for different test, thus the convenience and repeatability for testing GPS-related devices can improve.

Figure 2:
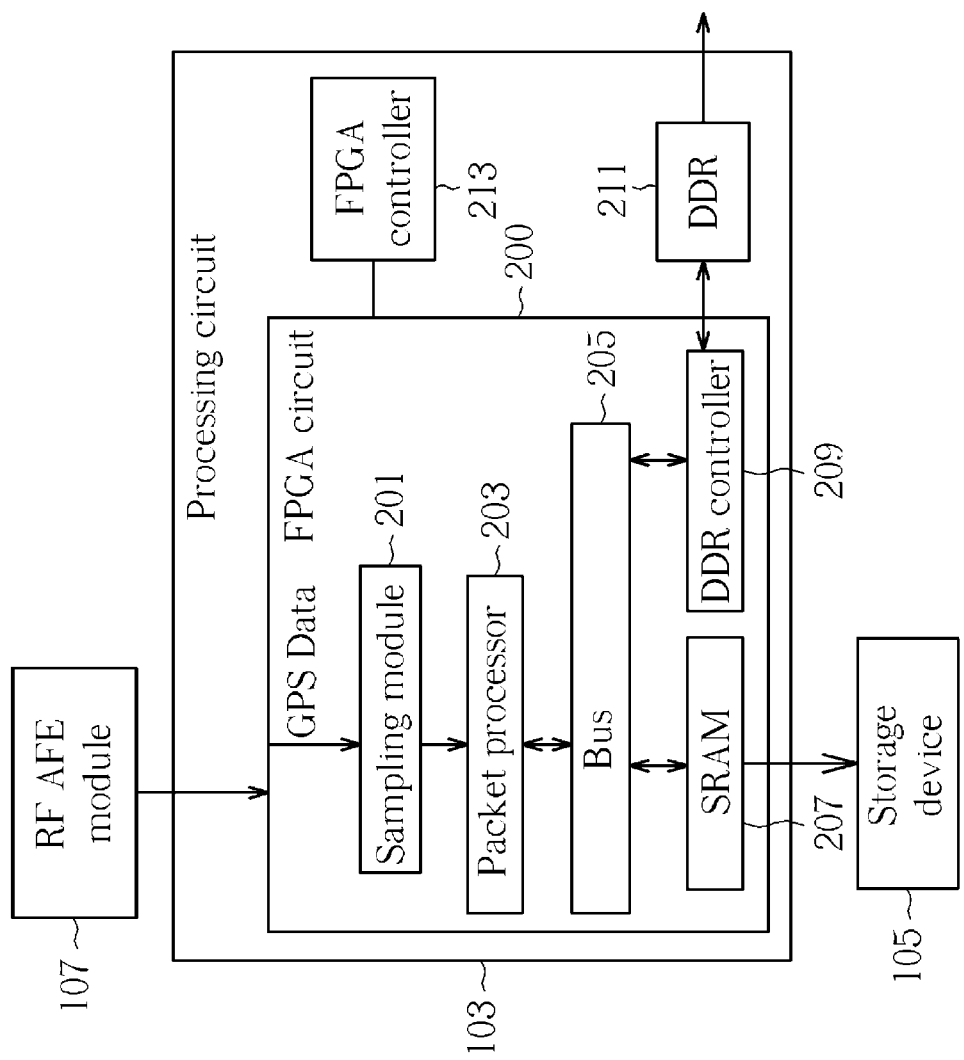
FIG. 2 is an embodiment of the processing circuit illustrated in FIG. 1.

FIG. 2 is an embodiment of the processing circuit 103 illustrated in FIG. 1. The processing circuit 103 is implemented with FPGA (Field Programmable Gate Array) architecture in the embodiment shown in FIG. 2. As shown in FIG. 2, the processing circuit 103 includes an FPGA circuit 200, a DRAM 211 and an FPGA controller 213. The FPGA circuit 200 includes a sampling module 201, a packet processor 203, a bus 205, a SRAM 207, and a DDR controller 209. The FPGA controller 213 includes a control code for controlling the operation of the FPGA circuit 200. The sampling module 201 is used for sampling GPS data received from the RF AFE module 107, and the packet processor 203 processes the sampled GPS data to generate a data packet. Finally, the data packet is stored to the storage device 105. The packet processor 203 unpacketizes the data packet to original sampled GPS data if the sampled GPS data is to be utilized. The SRAM 207 is utilized as a buffer when the FPGA circuit 200 stores data packets to the storage device 105 and when the data packet retrieved from the storage device 105 is unpacketized. The DRAM 211 is utilized as a buffer for the outputting of the sampled GPS data unpacketized from the data packet. The DDR controller 209 is utilized for controlling the DRAM 211. In this embodiment, the packet processor 203 utilizes a bus 205 for communication and transmission of the SRAM 207 and the DDR controller 209, but it does not mean to limit the scope of the present invention. Also, the SRAM 207 and the DRAM 211 can be omitted for cost or design considerations. It should be noted that FIG. 2 only illustrates some major devices and persons skilled in the art can easily understand which detail elements are not illustrated. For example, there can be a connector between the sampling module 201 and the RF AFE module 107. Also, a USB interface and a USB controller can exist between a DRAM 207 and a storage device 105 for transmitting data.

In one embodiment, the external location auxiliary information is incorporated with the sampled GPS data to form the data packet by the packet processor 203. Therefore, the external location auxiliary information is stored in the storage device 105 with the corresponding sampled GPS data via the data packet, and capable of being retrieved by the processing circuit 103.

The circuit shown in FIG. 2 is only for example and does not mean to limit the scope of the present invention. Persons skilled in the art can utilize other circuit structures to reach the same function, which also falls in the scope of the present invention.

According to above-mentioned circuit, real GPS data can be recorded and be replayed as necessary, and GPS devices such as GPS receivers can thereby be tested indoors and do not need to be moved outside for experimenting. Thus, the convenience for testing GPS related devices increases. Additionally, it is not necessary to utilize an expensive GPS simulation system to compile simulated GPS data, the results of which will have differences from real-world GPS data. In this manner, costs decrease and the difference between the simulated GPS data and real GPS data also decrease.

Those skilled in the art will readily observe that numerous modifications and alterations of the device and method may be made while retaining the teachings of the invention.

What is claimed is:

1. A GPS data recording apparatus, comprising:
   a storage device;
   a processing circuit, coupled to the storage device, comprising:
      a sampling module, for sampling GPS data to generate sampled GPS data; and
      a packet processor, for packetizing the sampled GPS data to generate a data packet to be stored in the storage device, and for unpacketizing the stored data packet from the storage device if necessary; and
   a receiving unit, coupled to the storage device, for receiving location auxiliary information for location; wherein the location auxiliary information is incorporated with the sampled GPS data to form the data packet by the packet processor, where the location auxiliary information at least comprises car speed information;
   wherein the location auxiliary information is retrieved and processed, together with the sampled GPS data.

2. The GPS data recording apparatus of claim 1, further comprising an RF analog front end module, coupled to the processing circuit, for receiving a GPS RF signal and processing the GPS RF signal into the GPS data.

3. The GPS data recording apparatus of claim 1, wherein the unpacketized data is processed by a base-band circuit.

4. The GPS data recording apparatus of claim 1, wherein the location auxiliary information is received from one of a car speed detection module, a pulse per second module and an inertial navigating system.

5. A GPS data recording method, comprising steps of:
   obtaining GPS data;
   sampling the GPS data to generate sampled GPS data;
   packetizing the sampled GPS data to generate a data packet;
   storing the data packet in a storage device; and
   receiving location auxiliary information for location; wherein the location auxiliary information is incorporated with the sampled GPS data to form the data packet, where the location auxiliary information at least comprises car speed information;
   wherein the location auxiliary information is retrieved and processed, together with the sampled GPS data.

6. The GPS data recording method of claim 5, further comprising:
retrieving the data packet stored in the storage device; and
unpacketizing the data packet.

7. The GPS data recording method of claim 5, further comprising:
processing a GPS RF signal to the GPS data.

8. The GPS data recording method of claim 5, wherein the location auxiliary information is received from one of a car speed detection module, a pulse per second module and an inertial navigating system.

* * * * *